US012228240B2

(12) United States Patent
Luo et al.

(10) Patent No.: US 12,228,240 B2
(45) Date of Patent: Feb. 18, 2025

(54) MAGNETIC ATTRACTION ASSEMBLY FOR PLANT MONITORING DEVICE AND TENT

(71) Applicant: Sinowell (Shanghai) Co., Ltd., Shanghai (CN)

(72) Inventors: Jia Luo, Shanghai (CN); Yunfei Duan, Shanghai (CN); Liang Zhou, Shanghai (CN)

(73) Assignee: Sinowell (Shanghai) Co., Ltd., Shanghai (CN)

( * ) Notice: Subject to any disclaimer, the term of this patent is extended or adjusted under 35 U.S.C. 154(b) by 1 day.

(21) Appl. No.: 17/913,692

(22) PCT Filed: Apr. 24, 2022

(86) PCT No.: PCT/CN2022/088660
§ 371 (c)(1),
(2) Date: Sep. 22, 2022

(87) PCT Pub. No.: WO2023/123764
PCT Pub. Date: Jul. 6, 2023

(65) Prior Publication Data
US 2024/0200717 A1  Jun. 20, 2024

(30) Foreign Application Priority Data

Dec. 27, 2021  (CN) .......................... 202111616565.9
Dec. 27, 2021  (CN) .......................... 202123321381.8

(51) Int. Cl.
*F16M 13/02* (2006.01)
*E04H 15/32* (2006.01)

(52) U.S. Cl.
CPC ............. *F16M 13/02* (2013.01); *E04H 15/32* (2013.01)

(58) Field of Classification Search
CPC .......... F16M 13/02; E04H 15/32; A47G 1/17; B60R 2011/0057; B60R 2011/007;
(Continued)

(56) References Cited

U.S. PATENT DOCUMENTS 2,964,275 A * 12/1960 Atkinson ................. B60N 3/08
248/95
4,045,911 A *  9/1977 Ware ...................... A01G 9/249
47/DIG. 6
(Continued)

FOREIGN PATENT DOCUMENTS

CN     208332062 U     1/2019
CN     211628637 U    10/2020
(Continued)

OTHER PUBLICATIONS

International Search Report mailed Sep. 9, 2022, in connection with related International Patent Application No. PCT/CN2022/088660.

*Primary Examiner* — Christopher Garft
*Assistant Examiner* — Michael McDuffie
(74) *Attorney, Agent, or Firm* — ArentFox Schiff LLP

(57) ABSTRACT

A magnetic attraction assembly for the plant monitoring device is configured to detachably mount a plant monitoring device on an outer side of a tent and includes: a first connection member and a second connection member. The first connection member is arranged on an inner side surface of the tent or is integrated inside the tent. The second connection member is arranged on an outer side surface of the tent. One side surface of the second connection member is fixed to the plant monitoring device, at least one of the first connection member and the second connection member is a magnetic member, and the other side surface of the second connection member is attracted to the first connection member.

16 Claims, 4 Drawing Sheets

(58) Field of Classification Search
CPC ...... F16B 2001/0035; H01F 7/00; H01F 7/02; A01G 7/04; A01G 7/045; A01G 9/20; A01G 9/24; A01G 9/249
USPC ............ 248/683, 690, 692, 674, 675, 206.5, 248/309.4, 339
See application file for complete search history.

(56) References Cited

U.S. PATENT DOCUMENTS

| | | | | |
|---|---|---|---|---|
| 8,358,097 | B2* | 1/2013 | Cartwright | F21V 21/15 396/4 |
| 9,891,504 | B2* | 2/2018 | Fromm | G03B 17/563 |
| 10,143,144 | B2* | 12/2018 | Quazi | A01G 7/045 |
| 2005/0156085 | A1* | 7/2005 | Radovan | A46B 17/02 248/213.2 |
| 2006/0237604 | A1* | 10/2006 | Tan | G06F 1/1601 248/205.3 |
| 2009/0250574 | A1* | 10/2009 | Fullerton | G09F 7/04 248/206.5 |
| 2010/0064544 | A1* | 3/2010 | Luong | A47L 23/205 34/239 |
| 2010/0187387 | A1* | 7/2010 | Mitchell | A47G 23/0225 248/206.5 |
| 2011/0011994 | A1* | 1/2011 | Ahlstrom | A47G 1/168 248/206.5 |
| 2011/0056437 | A1* | 3/2011 | Sprung | A01K 63/006 119/51.04 |
| 2014/0061409 | A1* | 3/2014 | Mayhew, Jr. | F16M 13/02 248/206.5 |
| 2016/0236626 | A1* | 8/2016 | Yialamas | B60R 11/02 |

FOREIGN PATENT DOCUMENTS

| | | |
|---|---|---|
| CN | 211746029 U | 10/2020 |
| CN | 213480046 U | 6/2021 |
| CN | 114151669 A | 3/2022 |
| EP | 3469887 A | 4/2019 |
| TW | M526323 U | 8/2016 |

* cited by examiner

MAGNETIC ATTRACTION ASSEMBLY FOR PLANT MONITORING DEVICE AND TENT

CROSS-REFERENCE TO RELATED APPLICATION(S)

This is a national stage application filed under 37 U.S.C. 371 based on International Patent Application No. PCT/CN2022/088660, filed Apr. 24, 2022, which claims priority to Chinese Patent Application No. 202111616565.9 filed with the China National Intellectual Property Administration (CNIPA) on Dec. 27, 2021, and Chinese Patent Application No. 202123321381.8 filed with the China National Intellectual Property Administration (CNIPA) on Dec. 27, 2021, the disclosures of which are incorporated herein by reference in their entirety.

TECHNICAL FIELD

The present application relates to the technical field of facility cultivation, for example, to a magnetic attraction assembly for a plant monitoring device, and a tent.

BACKGROUND

An open plane farmland is usually used in traditional large-scale cultivation farms, which requires a large area and is easily affected by weather, resulting in unstable yields and having the risk of contamination by alien organisms. Therefore, the cultivation of crops with a high economic value is mainly based on facility cultivation, which mainly uses related devices to control energy sources, such as light, water and air that the crops rely on to grow to obtain stable and high-quality harvests, and thereby to increase the output value of the harvest.

It is well known that whether the light conditions are appropriate or not can affect the growth quality of the plants. Control of the degree of sunlight exposure to the crops according to planting characteristics has become a critical factor in the success or failure of planting the crops. Plant growth lights are mostly composed of photoelectric elements (such as light-emitting diodes) that can generate predetermined colors of light, and can generate full spectrum or high brightness designed to simulate sunlight, so that the user controls the light conditions such as a light source frequency, an amplitude, a cycle ratio and the like of the plant growth lights through the controller according to different types of the planted plants. However, the controller is fixed outside the tent, which is inconvenient for the installation and removal, and the appearance does not look good.

SUMMARY

The present application provides a magnetic attraction assembly for a plant monitoring device, and a tent. A second connection member capable of being attracted to the first connection member is provided so that the plant monitoring device is detachably connected to an outer side surface of the tent, which is convenient to install and remove the plant monitoring device and does not affect the appearance of the tent.

The present application provides a magnetic attraction assembly for a plant monitoring device, configured to detachably mount a plant monitoring device on an outer side of a tent. The magnetic attraction assembly for the plant monitoring device includes a first connection member and a second connection member.

The first connection member is arranged on an inner side surface of the tent or is integrated inside the tent.

The second connection member is arranged on an outer side surface of the tent, one side surface of the second connection member is fixed to the plant monitoring device, at least one of the first connection member and the second connection member is a magnetic member, and the other side surface of the second connection member is attracted to the first connection member.

The present application further provides a tent including the magnetic attraction assembly for the plant monitoring device in any one of the preceding solutions.

REFERENCE LIST

Figure 1:
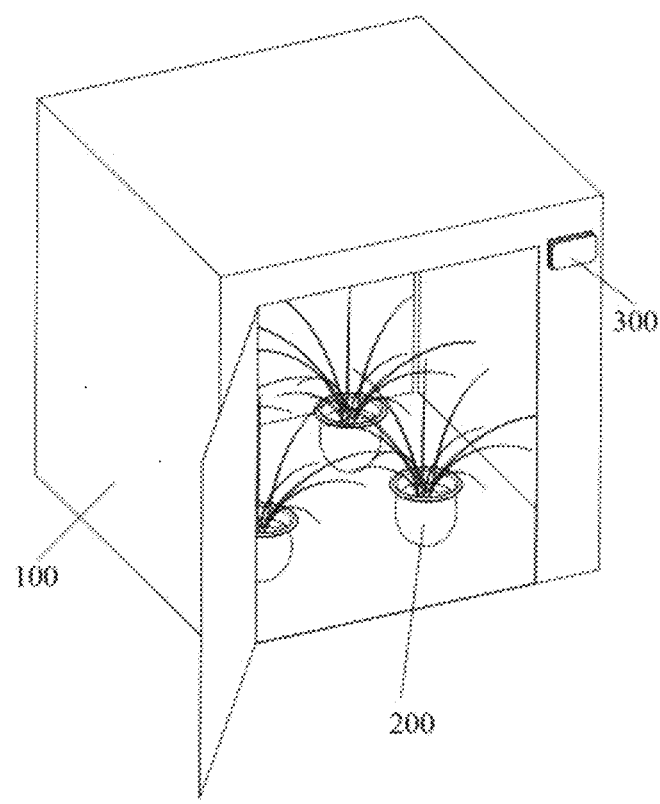
FIG. 1 is a view showing an external structure of a tent provided by an embodiment of the present application.

100 tent
101 horizontal support rod
102 vertical support rod
200 plant
300 plant monitoring device
1 first connection member
11 lower hook
2 second connection member
3 first clamping member
31 first buckle
32 upper hook
4 hanging rope
5 adapter
51 adapter portion
52 adapter hook
6 magnet
7 second clamping member
71 second buckle
8 object-placing bag

DETAILED DESCRIPTION

The present application will be described below in detail in conjunction with the drawings. The embodiments described below are part of the embodiments of the present application.

In the description of the present application, the orientations or position relations indicated by terms such as "center", "above", "below", "left", "right", "vertical", "horizontal", "inside", "outside" and the like are based on orientations or position relations shown in the drawings. These orientations or position relations are intended only to facilitate and simplify description of the present application, and not to indicate or imply that a device or element referred to must have such specific orientations or must be configured or operated in such specific orientations. Thus, these orientations or position relations are not to be construed as limiting the present application. In addition, terms such as "first" and "second" are used only for the purpose of description and are not to be construed as indicating or implying relative importance. Terms "first position" and "second position" are two different positions. Moreover, when the first feature is described as "on", "above", or "over" the second feature, the first feature is right on, above, or over the second feature or the first feature is obliquely on, above, or over the second feature, or the first feature is simply at a higher level than the second feature. When the first feature is described as "under", "below", or "underneath" the second feature, the first feature is right under, below, or underneath the second feature or the first feature is obliquely under, below, or underneath the second feature, or the first feature is simply at a lower level than the second feature.

In the description of the present application, unless otherwise specified and limited, the term "mounted", "connected to each other", or "connected" is to be construed in a broad sense as securely connected, detachably connected, or integrated; mechanically connected or electrically connected; directly connected to each other or indirectly connected to each other via an intermediary; or intraconnected between two components. For those of ordinary skill in the art, meanings of the preceding terms can be understood according to situations in the present application.

Embodiments of the present application are described in detail below, and examples of the embodiments are illustrated in the drawings, where the same or similar reference numerals indicate the same or similar elements or elements having the same or similar functions. The embodiments described below with reference to the drawings are exemplary, intended only to explain the present application, and not to be construed as limiting the present application.

Embodiment One

As shown in FIGS. 1 to 6, the present embodiment provides a magnetic attraction assembly for a plant monitoring device, which is configured to detachably mount a plant monitoring device 300 on an outer side of a tent 100. The space inside the tent 100 is set up for preparing a plant 200. The magnetic attraction assembly for the plant monitoring device includes a first connection member 1 and a second connection member 2. The first connection member 1 is arranged on an inner side surface of the tent 100 or is integrated inside the tent 100. When the first connection member 1 is integrated inside the tent 100, a double-layer fabric structure needs to be provided at a position of fixing the first connection member 1 to the tent 100, and the first connection member 1 is sewn between double layers of fabrics. The second connection member 2 is arranged on an outer side surface of the tent 100, one side surface of the second connection member 2 is fixed to the plant monitoring device 300, at least one of the first connection member 1 and the second connection member 2 is a magnetic member, and the other side surface of the second connection member 2 is attracted to the first connection member 1. In the present embodiment, the plant monitoring device 300 may be a controller configured to control a plant growth light within the tent 100. In other embodiments, the plant monitoring device 300 may also be a small device such as a sensor, a displayer or the like for planting, and the plant monitoring device 300 is not limited in the present embodiment.

In the present embodiment, in the magnetic attraction assembly for the plant monitoring device, the second connection member 2 capable of being attracted to the first connection member 1 is provided, the first connection member 1 is arranged inside the tent 100, the second connection member 2 is arranged on the outer side surface of the tent 100, one side surface of the second connection member 2 is fixed to the plant monitoring device 300, and the other side surface of the second connection member 2 is attracted to the first connection member 1, so that the plant monitoring device 300 is detachably connected to the outer side surface of the tent 100, which is convenient to install and remove the plant monitoring device 300 and does not affect the appearance of the tent 100.

With regard to the arrangement of the second connection member 2 and the first connection member 1, in the present embodiment, optionally, the second connection member 2 is a magnetic member, the first connection member 1 is capable of being attracted by the magnetic member, and an area of the first connection member 1 is larger than an attraction area of the second connection member 2. The magnetic member may be an electromagnet or a permanent magnet. With such arrangement, the plant monitoring device 300 can be mounted at multiple positions, and can be suitable for users having different heights. In other implementation modes of the present embodiment, the first connection member 1 is the magnetic member, and the second connection member 2 is made of a material capable of being attracted by the magnetic member; or the first connection member 1 and the second connection member 2 may be both magnetic member.

Figure 2:
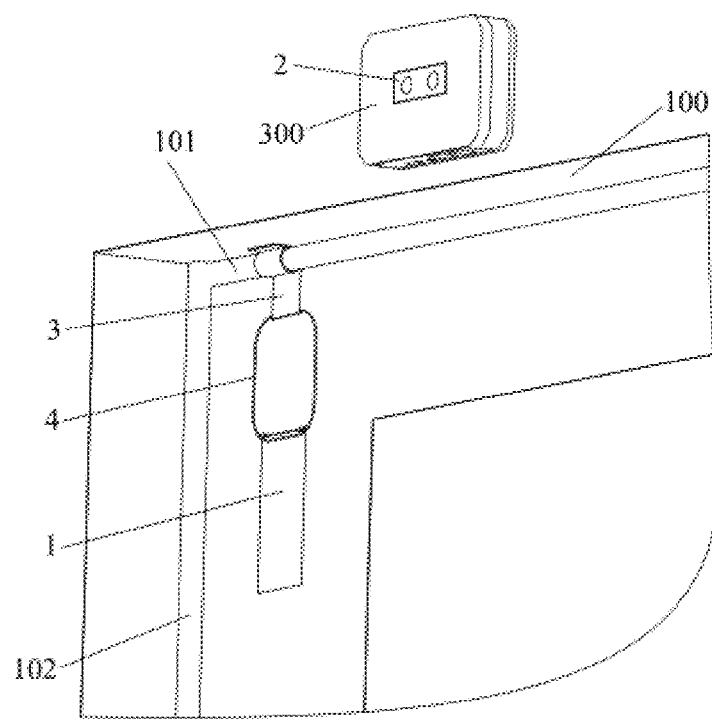
FIG. 2 is a structural view of a magnetic attraction assembly for a plant monitoring device including a first clamping member provided by an embodiment of the present application.
Figure 3:
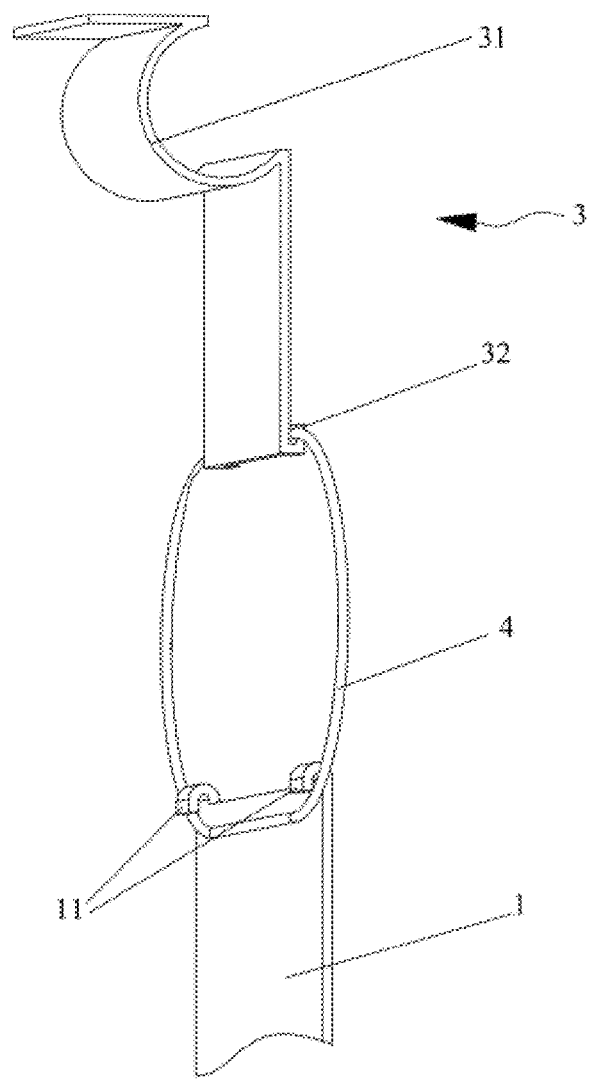
FIG. 3 is a fitting schematic view of a first clamping member, a hanging rope and a first connection member provided by an embodiment of the present application.

The first connection member 1 may be arranged in the tent 100 in many manners. ways. One connection mode is provided in the present embodiment. As shown in FIGS. 2 to 3, a horizontal support rod 101 is provided within the tent 100 and is configured to support the fabric of the tent 100. The magnetic attraction assembly of the plant monitoring device further includes a first clamping member 3, one end of the first clamping member 3 is provided with a first buckle 31, the other end of the first clamping member 3 is provided with an upper hook 32, and the first buckle 31 clamps the horizontal support rod 101; and one end of the first connection member 1 is provided with a lower hook 11, and the first connection member 1 is hung on the upper hook 32 of the first clamping member 3 through the lower hook 11. With the arrangement of the above structure, the first connection member 1 can be placed and easily disassembled.

Figure 5:
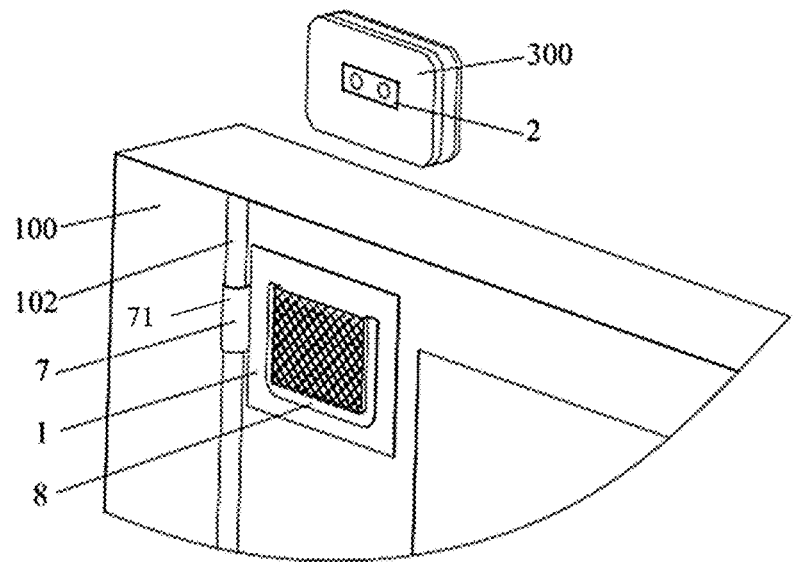
FIG. 5 is a structural view of the magnetic attraction assembly for the plant monitoring device including a second clamping member provided by an embodiment of the present application.
Figure 6:
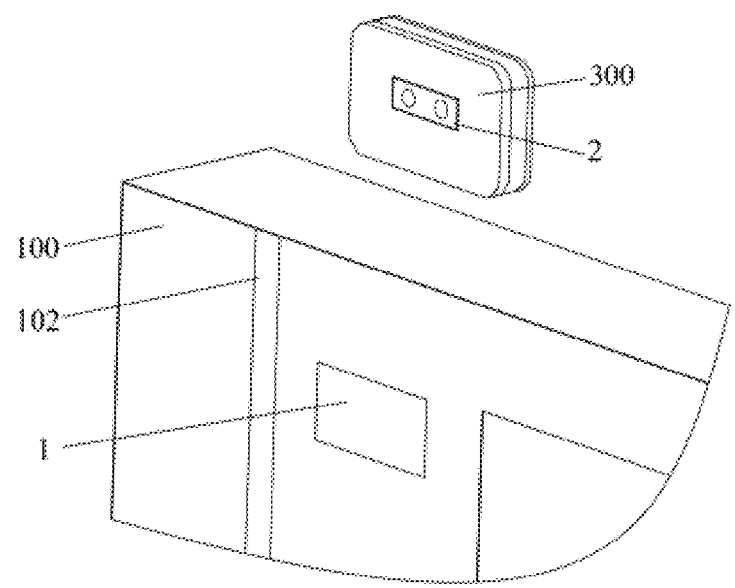
FIG. 6 is a structural view showing that the first connection member is bonded to the tent provided by an embodiment of the present application.

The structure of the magnetic attraction assembly of the plant monitoring device including the first clamping member 3 is illustrated from a perspective of viewing from the inside to the outside of the tent 100 in FIG. 2, and to clearly reflect the structure relationship between the second connection member 2 and the plant monitoring device 300, the structural view of the second connection member 2 and the plant monitoring device 300 is provided independently. In practice, the second connection member 2 and the plant monitoring device 300 are arranged on the outer side surface of the tent 100, and the second connection member 2 is attracted to the first connection member 1. That is, in the practical application, the second connection member 2 and the plant monitoring device 300 are located at a position on the outer side surface of the tent 100 and opposite to the first connection member 1. The patterning mode in FIGS. 5 and 6 is same as that in FIG. 2.

In the present embodiment, two upper hooks 32 are arranged and spaced apart in a horizontal direction, and two lower hooks 11 are arranged and spaced apart in the horizontal direction. With such arrangement, on the one hand, the number of hooks is increased and the stability of the first connection member 1 is improved; and on the other hand, the hook area is reduced and the cost is saved.

The magnetic attraction assembly of the plant monitoring device further includes a hanging rope 4, and two ends of the hanging rope 4 are hooked on the upper hook 32 and the lower hook 11 respectively. With the arrangement of the hanging rope 4, structures of the upper hook 32 and the lower hook 11 may be not fitted with each other as long as the upper hook 32 and the lower hook 11 can hang the hanging rope 4, which reduces the difficulty in designing and processing.

In the present embodiment, the hanging rope 4 is a ring structure. With such arrangement, on the one hand, the first connection member 1 is hung by two ropes, so that the firmness can be increased; and on the other hand, the hanging rope 4 in the ring structure is easy to be hooked on the upper hook 32 and the lower hook 11 due to having a larger hole, which improves the connection efficiency between the hanging rope 4 and the upper hook 32 as well as the lower hook 11.

In the present embodiment, the upper hook 32 is located on a side surface of the first clamping member 3 close to the tent 100. With the preceding arrangement, the hanging rope 4 is located between the first clamping member 3 and the tent 100, avoiding the detachment of the hanging rope 4 and the upper hook 32 caused by accidental collisions, thereby improving the safety of the hanging rope 4.

Figure 4:
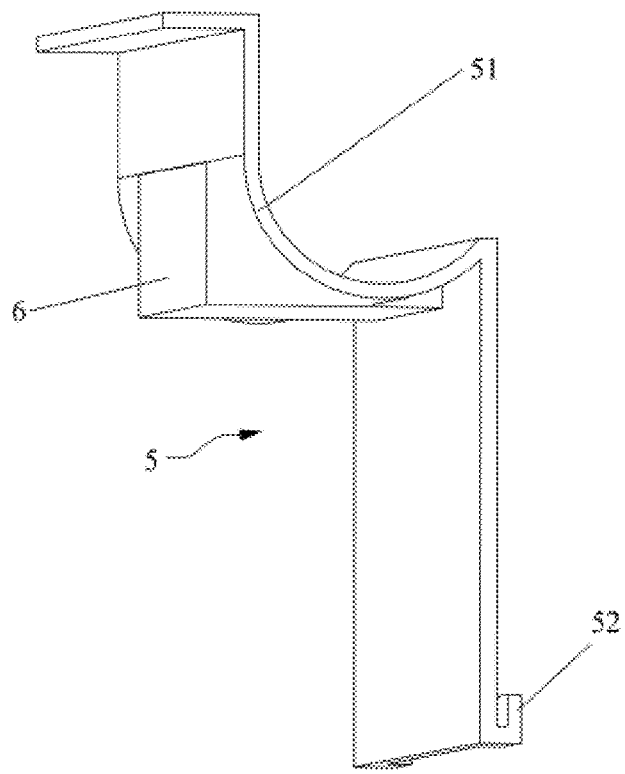
FIG. 4 is a structural view of an adapter provided by an embodiment of the present application.

To make the first connection member 1 be attached tightly to the inner side surface of the tent 100, in the present embodiment, the lower hook 11 is located on the side surface of the first connection member 1 away from the tent 100. The thickness dimension of the first connection member 1 is greater than a distance between the first clamping member 3 and the inner side surface of the tent 100. As shown in FIG. 4, another connection mode of the first connection member 1 is provided in the present embodiment. The magnetic attraction assembly for the plant monitoring device further includes a magnet 6 and an adapter 5. The magnet 6 is partially embedded in one end of the adapter 5 and is attached to the horizontal support rod 101; the other end of the adapter 5 is provided with an adapter hook 52; one end of the first connection member 1 is provided with a lower hook 11; and the first connection member 1 is hung on the adapter hook 52 of the adapter 5 through the lower hook 11. In other implementation modes of the present embodiment, one end of the adapter 5 is provided with an adapter portion 51, the magnet 6 is arranged on one side of the adapter portion 51 away from the horizontal support rod 101, and is able to attract the horizontal support rod 101 through the adapter portion 51. The shape of the adapter portion 51 is adapted to the horizontal support rod 101. With such arrangement, the quick connection between the adapter 5 and the horizontal support rod 101 is achieved, the connection efficiency of the adapter 5 is improved, and further the connection efficiency of the plant monitoring device 300 is improved. Reference can be made to the structure of the upper hook 32 for the arrangement of the adapter hook 52, and thus will not be described herein.

Another connection mode of the first connection member 1 is provided in the present embodiment. A vertical support rod 102 is arranged within the tent 100, the vertical support rod 102 is connected to the horizontal support rod 101, and both of the vertical support rod and the horizontal support rod are configured to support the fabric of the tent 100. The magnetic attraction assembly for the plant monitoring device further includes a second clamping member 7, one end of the second clamping member 7 is provided with a second buckle 71, and the other end of the second clamping member 7 is fixedly connected to the first connection member 1. The second buckle 71 is able to clamp the vertical support rod 102. The preceding arrangement can fix the first connection member 1 to the vertical support rod 102, reasonably utilizes the internal support structure of the tent 100, and is suitable for setting the first connection member 1 at different heights. When the first connection member 1 is made of a stainless steel, the first connection member 1 may be welded or integrally formed with the second clamping member 7.

To improve the firmness of the first connection member 1, in the present embodiment, the magnetic attraction assembly for the plant monitoring device further includes the magnet 6. The magnet 6 is fixedly arranged on the first clamping member 3 or the second clamping member 7, and is configured to attract the horizontal support rod 101 or the vertical support rod 102. In the present embodiment, at least one of the horizontal support rod 101 or the vertical support rod 102 is made of a material, such as a stainless steel or an iron, capable of being attracted by the magnet 6. The first connection member 1 can be firmly fixed inside the tent 100 by a double fixing mode of clamping and attracting. Optionally, the first clamping member 3 and the second clamping member 7 may both be made of the stainless steel. The first clamping member 31 and the second clamping member 71 have a same structure and are both formed by bending stainless steel plates into clamping grooves. The shape of the clamping grooves is the shape of the horizontal support rod 101 or the vertical support rod 102. The cross-sectional shape of the horizontal support rod 101 and the cross-sectional shape of the vertical support rod 102 are both circular, and the cross-sectional shape of the clamping groove is an arc-shaped structure.

The fixing mode of the first connection member 1 may also be achieved in the following manner: the first connection member 1 is bonded to the inner side surface of the tent 100. For example, the first connection member 1 is bonded to the inner side surface of the tent 100 by a double-sided adhesive or a glue. In the present embodiment, the tent 100 may be a single-layer fabric or a double-layer fabric. If the tent 100 is in a double-layer fabric structure, the first connection member 1 is bonded to the inner fabric. This manner is simple and quick, and low in cost.

The magnetic attraction assembly for the plant monitoring device further includes an object-placing bag 8, the object-placing bag 8 is fixed to the first connection member 1. In the present embodiment, the object-placing bag 8 includes a netting. With the preceding arrangement, the use of the magnetic attraction assembly for the plant monitoring device is increased, and the practicability is improved.

Embodiment Two

The present embodiment further provides a tent including the magnetic attraction assembly for the plant monitoring device in the preceding solution.

What is claimed is:

1. A magnetic attraction assembly for a plant monitoring device, configured to detachably mount a plant monitoring device on an outer side of a tent, wherein the magnetic attraction assembly for the plant monitoring device comprises:
a first connection member, wherein the first connection member is arranged on an inner side surface of the tent or is integrated inside the tent; and
a second connection member, wherein the second connection member is arranged on the outer side surface of the tent, one side surface of the second connection member is fixed to the plant monitoring device, at least one of the first connection member and the second connection member is a magnetic member, an area of the first connection member is larger than an area of the other side surface of the second connection member, the other side surface of the second connection member is operable to be attracted to the first connection member at a plurality of positions, and the plurality of positions have different heights from ground.

2. The magnetic attraction assembly for the plant monitoring device of claim 1, wherein a horizontal support rod is provided within the tent; the magnetic attraction assembly for the plant monitoring device further comprises a first clamping member, one end of the first clamping member is provided with a first buckle, the other end of the first clamping member is provided with an upper hook, and the first buckle is configured to clamp the horizontal support rod; and one end of the first connection member is provided with a lower hook, and the first connection member is hung on the upper hook of the first clamping member through the lower hook.

3. The magnetic attraction assembly for the plant monitoring device of claim 2, further comprising a hanging rope, and two ends of the hanging rope are hooked on the upper hook and the lower hook respectively.

4. The magnetic attraction assembly for the plant monitoring device of claim 3, wherein the upper hook is located on a side surface of the first clamping member close to the tent.

5. The magnetic attraction assembly for the plant monitoring device of claim 4, wherein the lower hook is located on a side surface of the first clamping member away from the tent.

6. The magnetic attraction assembly for the plant monitoring device of claim 1, wherein a horizontal support rod is provided within the tent; the magnetic attraction assembly for the plant monitoring device further comprises a magnet and an adapter, the magnet is arranged at one end of the adapter and is attached to the horizontal support rod; the other end of the adapter is provided with an adapter hook; one end of the first connection member is provided with a lower hook; and the first connection member is hung on the adapter hook of the adapter through the lower hook.

7. The magnetic attraction assembly for the plant monitoring device of claim 1, wherein a vertical support rod is provided within the tent; the magnetic attraction assembly for the plant monitoring device further comprises a second clamping member, one end of the second clamping member is provided with a second buckle, the other end of the second clamping member is fixedly connected to the first connection member; and the second buckle is configured to clamp the vertical support rod.

8. The magnetic attraction assembly for the plant monitoring device of claim 1, wherein the first connection member is bonded to the inner side surface of the tent by a glue or a double-sided adhesive.

9. The magnetic attraction assembly for the plant monitoring device of claim 1, further comprising: an object-placing bag, wherein the object-placing bag is fixed to the first connection member.

10. The magnetic attraction assembly for the plant monitoring device of claim 2, further comprising: an object-placing bag, wherein the object-placing bag is fixed to the first connection member.

11. The magnetic attraction assembly for the plant monitoring device of claim 3, further comprising: an object-placing bag, wherein the object-placing bag is fixed to the first connection member.

12. The magnetic attraction assembly for the plant monitoring device of claim 4, further comprising: an object-placing bag, wherein the object-placing bag is fixed to the first connection member.

13. The magnetic attraction assembly for the plant monitoring device of claim 5, further comprising: an object-placing bag, wherein the object-placing bag is fixed to the first connection member.

14. The magnetic attraction assembly for the plant monitoring device of claim 6, further comprising: an object-placing bag, wherein the object-placing bag is fixed to the first connection member.

15. The magnetic attraction assembly for the plant monitoring device of claim 7, further comprising: an object-placing bag, wherein the object-placing bag is fixed to the first connection member.

16. The magnetic attraction assembly for the plant monitoring device of claim 8, further comprising: an object-placing bag, wherein the object-placing bag is fixed to the first connection member.

* * * * *